(12) United States Patent
Tapia

(10) Patent No.: US 9,591,491 B2
(45) Date of Patent: Mar. 7, 2017

(54) SELF-ORGANIZING WIRELESS BACKHAUL AMONG CELLULAR ACCESS POINTS

(71) Applicant: T-Mobile USA, Inc., Bellevue, WA (US)

(72) Inventor: Pablo Tapia, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 293 days.

(21) Appl. No.: 14/290,831

(22) Filed: May 29, 2014

(65) Prior Publication Data

US 2015/0350920 A1 Dec. 3, 2015

(51) Int. Cl.

| | | |
|---|---|---|
| H04W 40/00 | (2009.01) | |
| H04W 16/18 | (2009.01) | |
| H04W 72/04 | (2009.01) | |
| H04W 48/00 | (2009.01) | |
| H04W 76/00 | (2009.01) | |
| H04W 24/02 | (2009.01) | |
| H04W 72/00 | (2009.01) | |
| H04W 84/18 | (2009.01) | |
| H04W 92/20 | (2009.01) | |

(52) U.S. Cl.
CPC ........... *H04W 16/18* (2013.01); *H04W 24/02* (2013.01); *H04W 48/00* (2013.01); *H04W 72/04* (2013.01); *H04W 76/00* (2013.01); *H04W 72/00* (2013.01); *H04W 84/18* (2013.01); *H04W 92/20* (2013.01)

(58) Field of Classification Search
CPC ..................................................... H04W 16/18
See application file for complete search history.

(56) References Cited

U.S. PATENT DOCUMENTS

| | | |
|---|---|---|
| 2009/0312022 A1 | 12/2009 | Viorel et al. |
| 2010/0120367 A1* | 5/2010 | Nanda ............... H04B 7/024 455/63.1 |
| 2012/0307697 A1 | 12/2012 | Mukhopadhyay |
| 2013/0324076 A1 | 12/2013 | Harrang |
| 2013/0331114 A1 | 12/2013 | Gormley et al. |

FOREIGN PATENT DOCUMENTS

WO    WO2010132826    11/2010

OTHER PUBLICATIONS

PCT Search Report and Written Opinion mailed Sep. 3, 2015 for PCT Application No. PCT/US15/31385, 13 pages.

* cited by examiner

*Primary Examiner* — Justin Lee
(74) *Attorney, Agent, or Firm* — Lee & Hayes, PLLC

(57) ABSTRACT

Described herein are techniques preparing a wireless backhaul among cellular access points. The cellular access points may obtain either (i) locations of themselves and other devices or (ii) instructions for adjusting position of wireless transceivers of the cellular access points. Based at least in part on the locations or instructions, the cellular access points may adjust positions of the wireless transceivers and initiate wireless connections via the wireless transceivers. The cellular access points may receive the locations or instructions from a server of the telecommunication network, which may determine pairs of the cellular access points based at least in part on the locations of the cellular access points.

21 Claims, 8 Drawing Sheets

SELF-ORGANIZING WIRELESS BACKHAUL AMONG CELLULAR ACCESS POINTS

BACKGROUND

The every increasing number of telecommunication device users has led to substantial efforts by telecommunication network service providers to spread the reach and number of access networks. As part of these efforts, different cellular access points of varying reach have been developed and put in use. For example, cellular access points may include macrocell systems, and small cell systems such as microcell systems, picocell systems, femtocell systems, and radio remote units. Some cellular access points may be connected to a core network of a telecommunication service provider by wireline connections. Other cellular access points, such as microcell systems, picocell systems, femtocell systems, radio remote units, or other small cell systems, connect to the core network through a nearby cellular access point, such a macrocell system or other small cell system with a wireline connection. These connections between cellular access points are wireless and typically avoid use of the same licensed spectrum that is used by user devices for cellular communication. Such wireless connections include microwave connections, WiFi connections, WiMax connections, etc. To enable these wireless connections, however, a field engineer with knowledge of the locations of the different cellular access points in an area must adjust the positions of wireless transceivers, such as antenna arrays, to enable the cellular access points to wirelessly connect to each other. This in turn requires a substantial investment in manpower by telecommunication service providers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
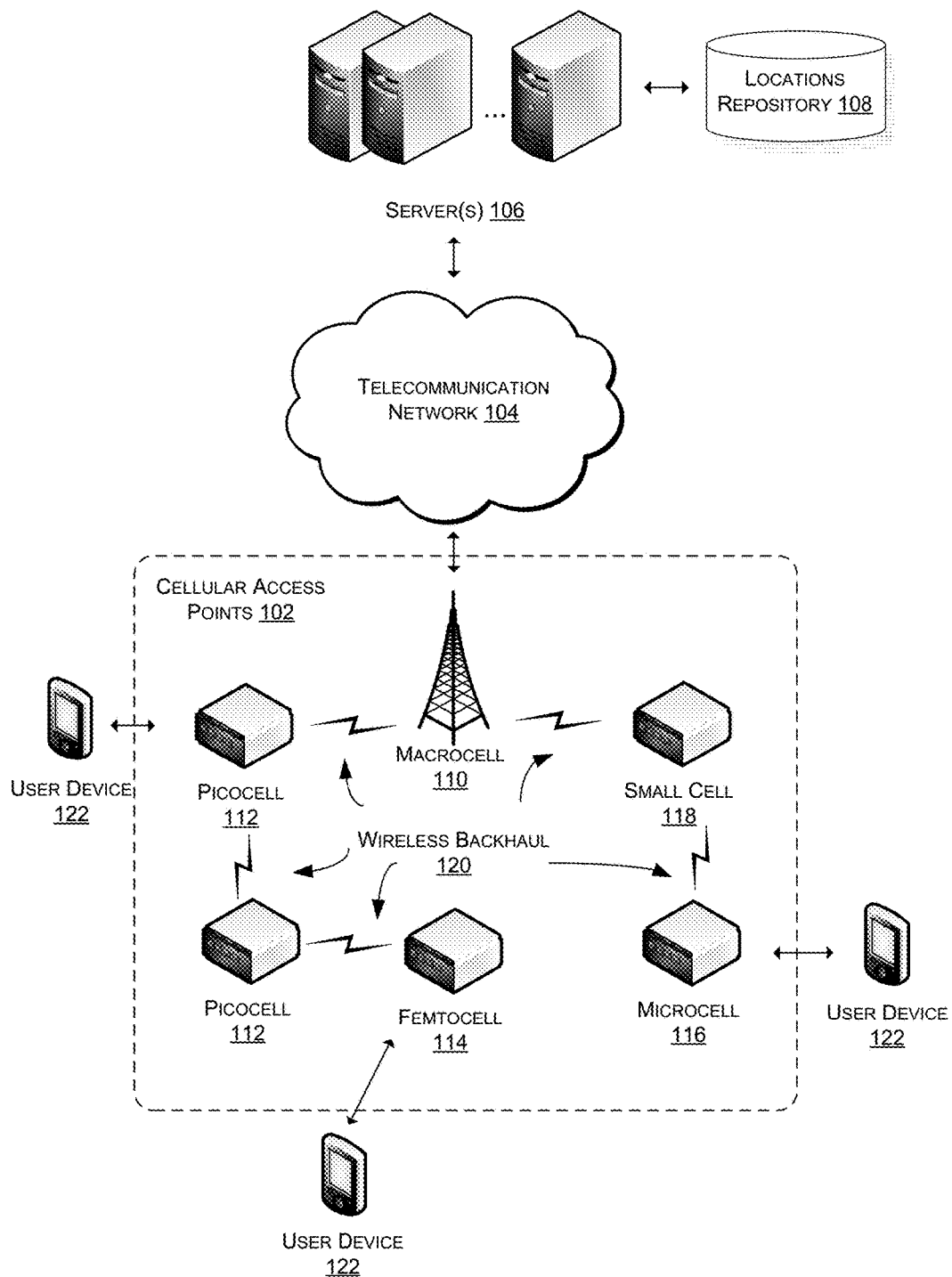
FIG. 1 illustrates an example environment including a plurality of cellular access points, such as small cell systems and a macrocell system, user devices capable of connecting to the cellular access points, and a server connected to the cellular access points via a telecommunication network which includes the cellular access points and the server.

This disclosure describes, in part, techniques for preparing a wireless backhaul among cellular access points. The cellular access points may include a macrocell system and small cell systems, such as microcell systems, picocell systems, femtocell systems, or radio remote units. The cellular access points may request and receive either (i) locations of themselves and other devices or (ii) instructions for adjusting position of wireless transceivers of the cellular access points. When a cellular access point is a small cell system, it may establish a cellular connection to either a macrocell system or another small cell system (e.g., a small cell system with a wireline connection) over a portion of licensed spectrum and may request the locations or instructions via the cellular connection. The macrocell system or other small cell system then relays the request from the small cell system to a server of the telecommunication network that includes the cellular access points. The server then provides the locations or instructions.

In various embodiments, upon receiving the locations or instructions and based at least in part on the locations or instructions, the cellular access points may adjust positions of the wireless transceivers. The instructions may include absolute angles or degrees of movement for the wireless transceivers. If locations are provided, the cellular access points may utilize the locations to determine target positions for the wireless transceivers and may adjust the positions of the wireless transceivers from current positions to the target positions. The cellular access points may then initiate wireless connections via the wireless transceivers. Such wireless connections may include microwave connections, WiFi connections, WiMax connections, or combinations thereof. Initiating the wireless connections may include performing radio frequency (RF) sweeps to detect the devices being wirelessly connected to and may involve beam-forming techniques. The resulting wireless connections form the wireless backhaul among the cellular access points.

The cellular access points may be further configured to maintain the wireless backhaul in response to loss of connectivity. For example, upon determining that one of its wireless connections has failed, a cellular access point may determine whether it has received additional locations or instructions for use in case on connectivity failure. If not, the cellular access point may request additional locations or instructions. Based on the previously or newly received additional locations or instructions, the cellular access point makes further adjustments to positions of some or all of its wireless transceiver(s) and initiates wireless connection(s) with further device(s).

The server of the telecommunication network providing the locations or instructions may be configured to retrieve locations of cellular access points from a location repository and to determine pairs of cellular access points based at least in part on the locations. The pairs may also be determined based on capacity, congestion, signal strength, and resource profiles. These pairs may then be used to determine the locations or instructions to provide to each cellular access point. The provided locations or instructions in turn enable receiving cellular access points of a pair to initiate wireless connections with each other. In some embodiments, the server may be a component of a self-organizing network (SON), such as a SON tool or SON engine.

Example Environment

FIG. 1 illustrates an example environment including a plurality of cellular access points, such as small cell systems and a macrocell system, user devices capable of connecting to the cellular access points, and a server connected to the cellular access points via a telecommunication network which includes the cellular access points and the server. As illustrated, a plurality of cellular access points of a telecommunication network 104 may receive locations or instructions from server(s) 106 of the telecommunication network 104, which may retrieve the locations from a location repository 108. The cellular access points 102 may include a macrocell system 110 (also referred to as a macrocell 110), picocell systems 112 (also referred to as picocells 112), a femtocell system 114 (also referred to as a femtocell 114), a microcell system 116 (also referred to as a microcell 116), and a small cell system 118 (also referred to as a small cell 118). These cellular access points 102 may form among themselves a wireless backhaul 120. Further, user devices 122 may connect to any of the cellular access points 102 to receive services of the telecommunication network 104.

Figure 3:
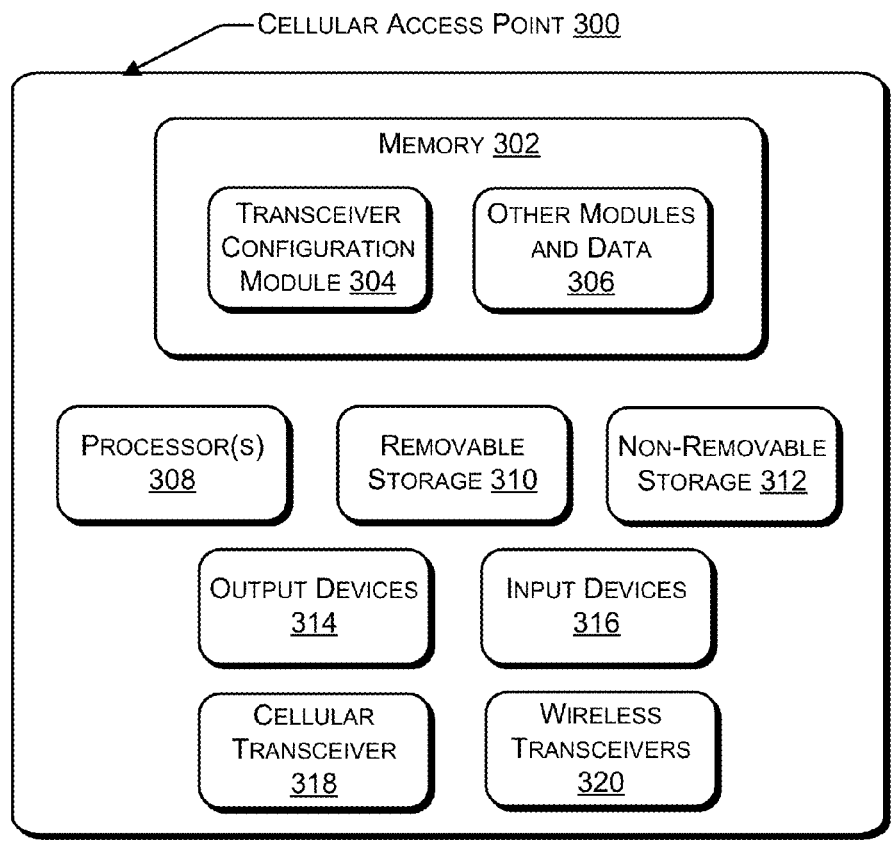
FIG. 3 illustrates a component level view of a cellular access point, including a cellular transceiver, wireless transceivers, and a transceiver configuration module.

In various embodiments, the cellular access points 102 may each be or include any sort of base station or access point device, such as a server, a work station, a personal computer (PC), a laptop computer, a tablet computer, an embedded system, or any other sort of device or devices. Each cellular access point 102 may be a base station, such as a node B or eNode B, associated with an area of coverage known as a cell. Further, each cellular access point may be equipped with transceivers, such as antennas, enabling RF communication over licensed spectrum, unlicensed spectrum, or some combination of both. The cellular access points 102 of FIG. 1 are each equipped with at least a cellular transceiver to enable cellular communication over licensed spectrum and at least one wireless transceiver enabling wireless communication, such as wireless communication over a microwave connection, a WiFi connection, a WiMax connection, or another sort of connection over unlicensed spectrum. The at least one wireless transceiver is configured to have its position adjusted by its cellular access point 102 to enable beam forming with other cellular access points 102. An example cellular access point 102 is illustrated in FIG. 3 and is described in detail below with reference to that figure.

The cellular access points 102 may include a macrocell 110. The macrocell 110 is equipped with an interface, such as a wireline interface (e.g., Ethernet port) connecting the macrocell 110 to the core network of the telecommunication network 104, either directly or through intermediate devices. The macrocell 110 also includes one or more cellular transceivers for cellular connections to other cellular access points 102 and to user devices 122 using licensed spectrum. Additionally, the macrocell 110 is equipped with at least one wireless transceiver, and possibly with wireless transceivers, each wireless transceiver configured to be positioned by the macrocell 110 independently of the other wireless transceivers. Alternatively (and not shown in FIG. 1), the cellular access points 102 may not include a macrocell 110, but rather may utilize a small cell system, such as one of the systems 112-118, equipped with a wireline interface (e.g., Ethernet port) connecting that small cell system to the core network of the telecommunication network 104.

The other cellular access points 102 may be small cell systems, such as picocells 112, femtocell 114, microcell 116, and other small cells 118 (e.g., radio remote units). Such small cell systems may have varying geographic reaches, with the microcell 116 having a greater reach than the picocells 112, and the picocells 112 having greater reach than the femtocell 114. These small cell systems connect to the core network of the telecommunication network 104 through the macrocell 110 or through a small cell system equipped with a wireline interface. The small cell systems may include both cellular transceiver(s) and wireless transceiver(s). They may receive calls and data connections from user devices 122 and may form the wireless backhaul 120.

In some embodiments, the cellular access points 102 may be positioned in different geographic locations and those geographic locations may be entered into the location repository 108 for use by the server(s) 106 in enabling the cellular access points 102 to prepare the wireless backhaul 120. Each cellular access point 102 may be equipped with a number of wireless transceivers, and cellular access points 102 that are intended to have more wireless connections may be equipped with more wireless transceivers.

Figure 2:
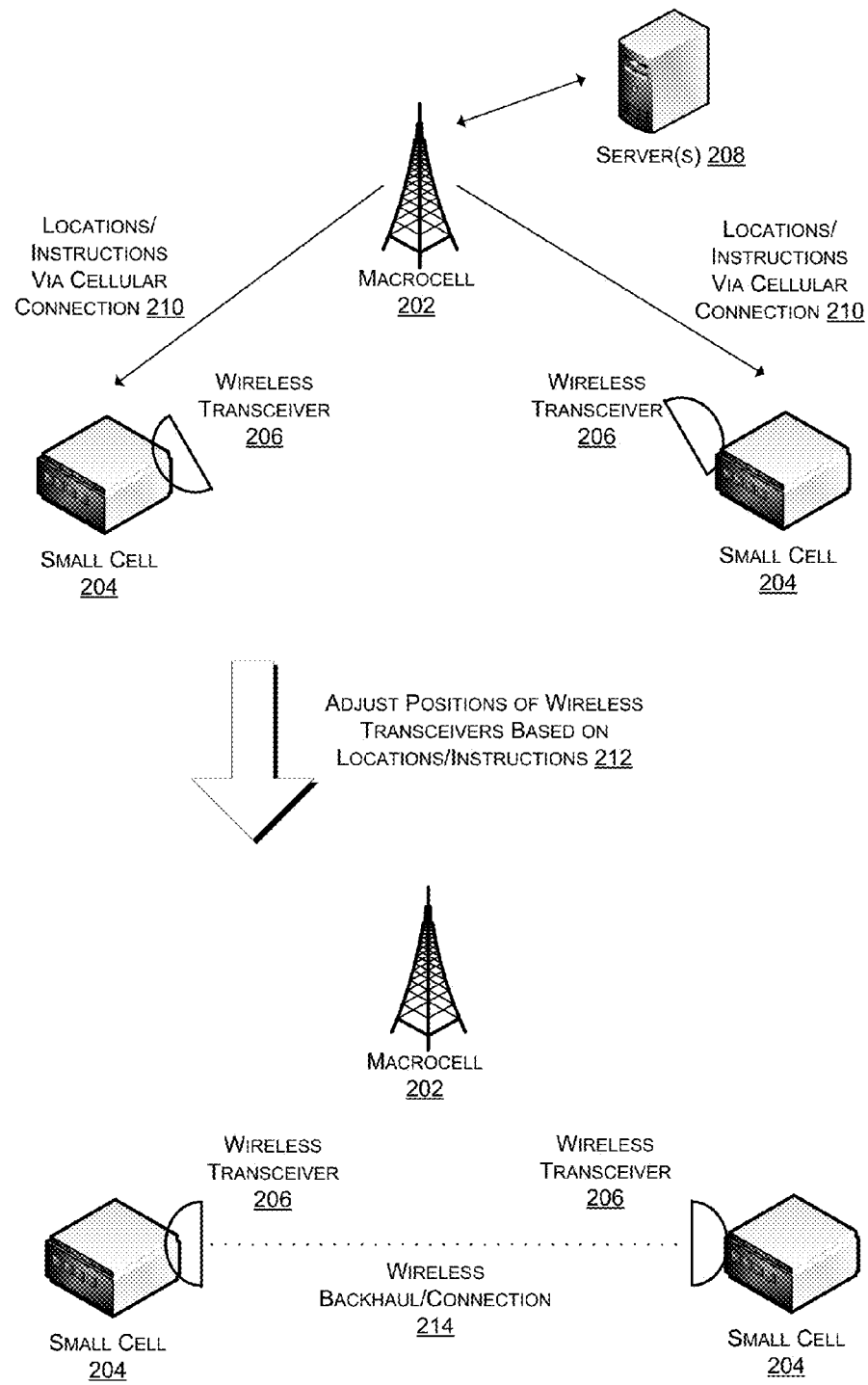
FIG. 2 illustrates example cellular access points obtaining cellular access point locations or obtaining instructions for adjusting positions of wireless transceivers of the cellular access points to prepare a wireless backhaul among the cellular access points.

The macrocell 110 may obtain locations or instructions from the server(s) 106 via its wireline connection, and the other cellular access points 102 may communicate with the macrocell 110 via a cellular connection, with the macrocell 110 relaying other cellular access point requests for locations and instructions to the server(s) 106 via the wireline connection. Once locations and instructions are received, cellular access points 102 adjust positions of their wireless transceivers based on the locations or instructions and initiate wireless connections via the wireless transceivers, the mesh of those wireless transceivers forming the wireless backhaul 120. The wireless backhaul 120 may then be used to communicate cellular traffic received at one cellular access point 102 through at least the macrocell 100 and potentially through other cellular access points 102 between the endpoint cellular access point 102 and the macrocell 110. These operations for preparing the wireless backhaul 120 are illustrated in FIG. 2 and are described below in greater detail with reference to that figure.

The telecommunication network 104 may be any sort of network operated by a telecommunication service provider. In some embodiments, the telecommunication network 104 is a SON or includes a SON configured by SON components to perform at least one of self-configuring, self-optimizing, or self-healing. The telecommunication network 104 may also include a plurality of access networks, such as a 2G, 3G, or 4G/LTE access networks, to enable circuit-switched and/or packet-switched communications. The cellular access points 102 may be part of one or more such access networks. The telecommunication network 104 may further include a core network. The server(s) 106 and location repository may be part of such a core network or may be accessed through the core network.

Figure 4:
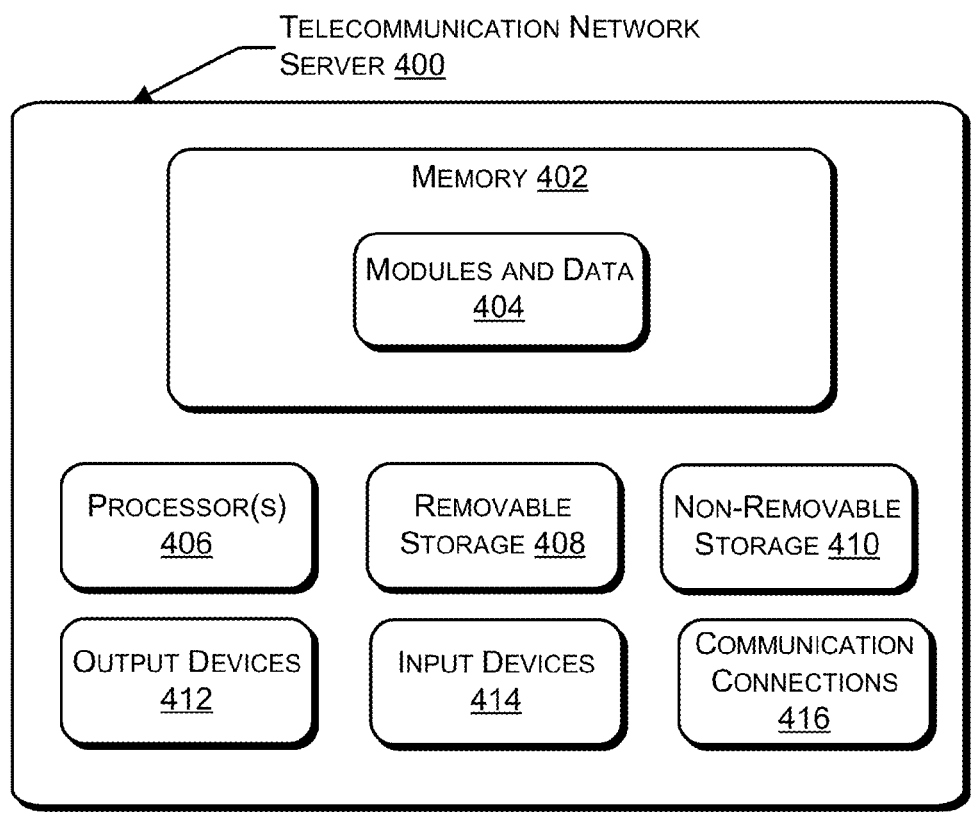
FIG. 4 illustrates a component level view of a telecommunication network server configured to provide cellular access point locations or wireless transceiver positioning instructions.

In various embodiments, the server(s) 106 may each be or include a server or server farm, multiple, distributed server farms, a mainframe, a work station, a PC, a laptop computer, a tablet computer, an embedded system, or any other sort of device or devices. In one implementation, the server(s) 106 represent a plurality of computing devices working in communication, such as a cloud computing network of nodes. The server(s) 106 may belong to the telecommunication network 104 or may be external to but in communication with the telecommunication network 104. An example server 106 is illustrated in FIG. 4 and is described in detail below with reference to that figure.

In some embodiments, the location repository 108 may be any sort of database or other structured or unstructured storage configured to store locations of the cellular access points 102. Each entry could include some sort of identifier or set of identifiers or other data for the cellular access points 102 and a location for that entry.

In various embodiments, the server(s) 106 may be an application-specific server which is configured to determine and provide locations or instructions enabling the cellular access points 102 to prepare the wireless backhaul 120. In some embodiments, the server(s) 106 may implement a SON tool or SON engine of the telecommunication network 104. An example of such a SON tool or SON engine is described in detail in U.S. patent application Ser. No. 13/831,082, which is entitled "Open Architecture for Self-Organizing Networks" and was filed on Mar. 14, 2013. The server(s) 106 may retrieve at least locations from the location repository 108, determine pairs of cellular access points 102 which make up the wireless backhaul 120, and provide locations or instructions based on those determined pairs to the cellular access points 102. These operations for determining and providing locations or instructions are illustrated in FIG. 2 and are described below in greater detail with reference to that figure.

In some embodiments, the user devices 122 may be any sort of telecommunication devices, such as cellular phones, smart phones, personal digital assistants (PDAs), PCs, tablet computers, laptops, game consoles, e-readers, or other sorts of mobile computing devices equipped with cellular communication capabilities. The user devices 122 may engage in cellular communication with a cellular access point 102, which may provide that cellular communication to the core network of the telecommunication network 104 either directly through a cellular access point with a wireline interface or indirectly through the wireless backhaul 120.

Example Preparation of Wireless Backhaul

FIG. 2 illustrates example cellular access points obtaining cellular access point locations or obtaining instructions for adjusting positions of wireless transceivers of the cellular access points to prepare a wireless backhaul among the cellular access points. The macrocell 202 may be an example of the macrocell 110 or may be replaced with a small cell equipped with a wireline interface. The small cells 204 may be examples of one or more of the picocells 112, the femtocell 114, the microcell 116, or the small cell 118, and the server(s) 208 may be example(s) of the server(s) 106, which are described above in detail with respect to FIG. 1.

The wireless transceivers 206 include any sort of wireless transceivers known in the art. For example, wireless transceivers 206 may include radio transceivers that perform the function of transmitting and receiving radio frequency communications via an antenna. The wireless transceivers 206 may also include wireless communication transceivers and near field antenna(s) for communicating over unlicensed spectrum, such as spectrum utilized for microwave connections, WiFi connections, WiMax connections, or other wireless connections, such as personal area networks (e.g., Bluetooth or near field communication (NFC) networks). Further, the wireless transceivers 206 may include a plurality of wireless transceivers configured to be positioned independently of one other to enable wireless connections with devices in a plurality of directions. The wireless transceivers 206 may utilize beam-forming technologies to wirelessly connect to other devices.

In various embodiments, the small cells 204 may initiate cellular communication with the macrocell 202 (or small cell with wireline interface) over licensed spectrum, which may be the same spectrum utilized by the user devices 122. Via the cellular connections resulting from these cellular communications, the small cells 204 may request locations or instructions to enable the small cells to prepare a wireless backhaul. The macrocell 202, upon receiving these requests via the cellular connections, may provide the requests to the server(s) 208. The macrocell 202 may also request locations and instructions from the server(s) 208. Such requests may be transmitted to the server(s) 208 via a wireline connection of the macrocell 202 with a telecommunication network.

The server(s) 208 may have previously determined the locations or instructions or may determine the locations or instructions responsive to receiving the requests. To determine the locations or instructions, the server(s) 208 may retrieve locations of the small cells 204, the macrocell 202, and/or other cellular access points from a location repository. In some embodiments, the server(s) 208 may also retrieve capacity, congestion, signal strength, and resource profiles associated with the small cells 204, the macrocell 202, and/or other cellular access points. Based at least on the retrieved locations, and also, optionally, on the capacity, congestion, signal strength, and resource profiles, the server (s) 208 determine pairs of the small cells 204, macrocell 202 and other cellular access points. For example, the server(s) 208 may simply pair small cells 204, macrocell 202 and other cellular access points based on geographic proximity, with a small cell 204 being paired with another small cell 204 which is closest to it, and one of the small cells 204 also being paired with the macrocell 202. The result chain of pairs forms a wireless backhaul. In other examples, the server(s) 208 may pair a first small cell 204 with a second small cell 204 which is further away from the first small cell 204 than a third small cell 204, but the second small cell 204 may be selected on account of capacity, congestion, signal strength, and resource profiles. Resource profile may include, for instance, indication of the number of wireless transceivers 206 of a small cell 204, macrocell 202, or other cellular access point.

Either in response to the requests or proactively, the server(s) 208 may provide locations of the small cells 204, macrocell 202, or other cellular access points constituting a pair to each member of that pair. Alternatively or additionally, the server(s) 208 may determine adjustments to wireless transceivers 206 of the small cells 204, macrocell 202, or other cellular access points constituting a pair to enable the members of that pair to adjust their wireless transceivers 206 and wirelessly connect to each other. The adjustment may be indicating by providing an absolute angle or a degree of movement to the members of the pair. The degree of movement may be based on current positions of wireless transceivers reported in the requests for locations or instructions.

In some embodiments, the server(s) 208 may determine both a first set of pairs of small cells 204, macrocell 202, and other cellular access points and a second set, the second set to be used by one of the small cells 204, macrocell 202, and other cellular access points if network connectivity is lost. Locations or instructions for both the first set and the second set may provide provided by the server(s) 208. In further embodiments, the server(s) 208 may determine any number of sets in any order of priority and may provide locations or instructions some or all of them at the same time.

The locations or instructions may be provided by the server(s) 208 to the macrocell 202, which may then provide 210 the locations or instructions to the small cells 204 via the cellular connections with those small cells 204.

In various embodiments, upon receiving the locations or instructions, the small cells 204 may adjust, at 212, the positions of their wireless transceivers 206 based on the locations or instructions. Though not shown, the macrocell 202 may also include wireless transceiver(s) 206, and either or both of the small cells 204 may include multiple wireless transceiver(s) 206. The macrocell 202 and small cells 204 may also adjust the positions of these wireless transceiver(s) 206 based on the locations or instructions.

In some embodiments, the instructions may specify an absolute angle or degree of movement, and the adjusting at 212 may simply comprise adjusting the position of a wireless transceiver 206 to that absolute angle or based on that degree of movement. In other embodiments in which locations are received, the small cells 204 may determine target positions for their wireless transceivers 206 based on the received locations and adjust positions of their wireless transceivers 206 from current positions to the target positions.

Once the positions of the wireless transceivers 206 have been adjusted, the small cells 204 may initiate wireless connections with each other using the wireless transceivers. At least one of the small cells 204 may also initiate a wireless connection with the macrocell 202 using an additional wireless transceiver of that small cell 204 and a wireless transceiver of the macrocell 202. In some embodiments, initiating the wireless communication may involve performing an RF sweep, beam forming, or both. The resulting wireless connections, such as wireless connection 214, may be microwave connections, WiFi connections, WiMax connections, other connections using unlicensed spectrum, other connections utilizing different licensed spectrum that that used for the user devices 202, or some combination thereof. This set of wireless connections, such as wireless connection 214, form a wireless backhaul, such as wireless backhaul 120.

In various embodiments, wireless connectivity may at some time be lost between small cells 204, the macrocell 202, and the other cellular access points. In response to determining a loss of wireless connectivity, a small cell 204, macrocell 202, or other cellular access point may determine a further adjustment to the position of its wireless transceiver. In some instances, this may involve determining whether additional locations or additional instructions were received with the initial locations or instructions (e.g., the above-described first and second sets of instructions). If such locations or instructions were received, they are used to determine the adjustment. If not, then the small cell 204, macrocell 202, or other cellular access point may request additional locations or instructions from server(s) 208. In some cases, this may involve repeating the operations described above for receiving the initial locations or instructions. Once the additional locations or instructions are received, the small cell 204, macrocell 202, or other cellular access point utilizes them to determine an adjustment. Based on the determined further adjustment, the small cell 204, macrocell 202, or other cellular access point then adjusts its wireless transceiver and initiates wireless communication with a further device, which may be different from the device with which connectivity failed. As a result, the wireless backhaul among the small cells 204, macrocell 202, or other cellular access point is maintained.

Example Devices

FIG. 3 illustrates a component level view of a cellular access point 300, including a cellular transceiver, wireless transceivers, and a transceiver configuration module. As illustrated, the cellular access point 300 comprises a system memory 302 storing a transceiver configuration module 304 and other modules and data 306. Also, the cellular access point 300 includes processor(s) 308, a removable storage 310, a non-removable storage 312, output device(s) 314, input device(s) 316, a cellular transceiver 318, and wireless transceivers 320. In various embodiments, the cellular access point 300 may be an example of the cellular access points 102, the macrocell system 202 or the small cell systems 204.

In various embodiments, system memory 302 is volatile (such as RAM), non-volatile (such as ROM, flash memory, etc.) or some combination of the two. The transceiver configuration module 304 may be any one or more modules configured to perform any or all of the operations described above with respect to the cellular access points 102, the macrocell system 202 or the small cell systems 204, such as receiving locations or instructions, adjusting positions of wireless transceivers based on the positions or instructions, and initiating wireless communication via the wireless transceivers. The other modules or data 306 stored in the system memory 302 may comprise any sort of applications or platform components of the cellular access point 300, as well as data associated with such applications or platform components.

In some embodiments, the processor(s) 308 is a central processing unit (CPU), a graphics processing unit (GPU), or both CPU and GPU, or any other sort of processing unit.

The cellular access point 300 also includes additional data storage devices (removable and/or non-removable) such as, for example, magnetic disks, optical disks, or tape. Such additional storage is illustrated in FIG. 3 by removable storage 310 and non-removable storage 312. Non-transitory computer-readable media may include volatile and nonvolatile, removable and non-removable media implemented in any method or technology for storage of information, such as computer readable instructions, data structures, program modules, or other data. System memory 302, removable storage 310 and non-removable storage 312 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the cellular access point 300. Any such non-transitory computer-readable media may be part of the cellular access point 300.

In some embodiments, the output devices 314 include any sort of output devices known in the art, such as a display (e.g., a liquid crystal display), speakers, a vibrating mechanism, or a tactile feedback mechanism. Output devices 314 also include ports for one or more peripheral devices, such as headphones, peripheral speakers, or a peripheral display.

In various embodiments, input devices 316 include any sort of input devices known in the art. For example, input devices 316 may include a camera, a microphone, a keyboard/keypad, or a touch-sensitive display. A keyboard/ keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

In some embodiments, the cellular transceiver 318 may be any sort of cellular transceiver known in the art. For example, cellular transceiver 318 may include a radio transceiver that performs the function of transmitting and receiving radio frequency communications via an antenna. The cellular transceiver 318 may facilitate wireless connectivity between the cellular access point 300 and either or both of other cellular access points or user devices. Further, the cellular transceiver 318 may include wired communication components, such as an Ethernet port, that connect the cellular transceiver 318 in a wired fashion to one or more other devices of the telecommunication network.

The wireless transceivers 320 include any sort of wireless transceivers known in the art. For example, wireless transceivers 320 may include radio transceivers that perform the function of transmitting and receiving radio frequency communications via an antenna. The wireless transceivers 320 may also include wireless communication transceivers and near field antenna(s) for communicating over unlicensed spectrum, such as spectrum utilized for microwave connections, WiFi connections, WiMax connections, or other wireless connections, such as personal area networks (e.g., Bluetooth or near field communication (NFC) networks). Further, the wireless transceivers 320 may include a plurality of wireless transceivers configured to be positioned independently of one other to enable wireless connections with devices in a plurality of directions. The wireless transceivers 320 may utilize beam-forming technologies to wirelessly connect to other devices.

FIG. 4 illustrates a component level view of a telecommunication network server 400 configured to provide cellular access point locations or wireless transceiver positioning instructions. As illustrated, the telecommunication network server 400 comprises a system memory 402 storing one or more modules and data 404. Also, the telecommunication network server 400 includes processor(s) 406, a removable storage 408, a non-removable storage 410, output device(s) 412, input device(s) 414, and communication connections 416. In various embodiments, the telecommunication network server 400 may be an example of the server(s) 106 or the server(s) 208.

In various embodiments, system memory 402 is volatile (such as RAM), non-volatile (such as ROM, flash memory, etc.) or some combination of the two. The modules or data 404 stored in the system memory 402 may comprise any sort of applications or platform components of the telecommunication network server 400, as well as data associated with such applications or platform components. Such applications and platform components may be capable of performing any or all of the operations described above with respect to the server(s) 106 and the server(s) 208. Further, in some embodiments, the modules and data 404 may include the locations repository 108.

In some embodiments, the processor(s) 406 is a central processing unit (CPU), a graphics processing unit (GPU), or both CPU and GPU, or any other sort of processing unit.

The telecommunication network server 400 also includes additional data storage devices (removable and/or non-removable) such as, for example, magnetic disks, optical disks, or tape. Such additional storage is illustrated in FIG. 4 by removable storage 408 and non-removable storage 410.

Non-transitory computer-readable media may include volatile and nonvolatile, removable and non-removable media implemented in any method or technology for storage of information, such as computer readable instructions, data structures, program modules, or other data. System memory 402, removable storage 408 and non-removable storage 410 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the telecommunication network server 400. Any such non-transitory computer-readable media may be part of the telecommunication network server 400.

In some embodiments, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various embodiments, input devices 414 include any sort of input devices known in the art. For example, input devices 414 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

In some embodiments, the communication connections 416 may include any software and hardware components known in the art enabling wired communication, wireless communication, or both.

Example Processes

FIGS. 5-8 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
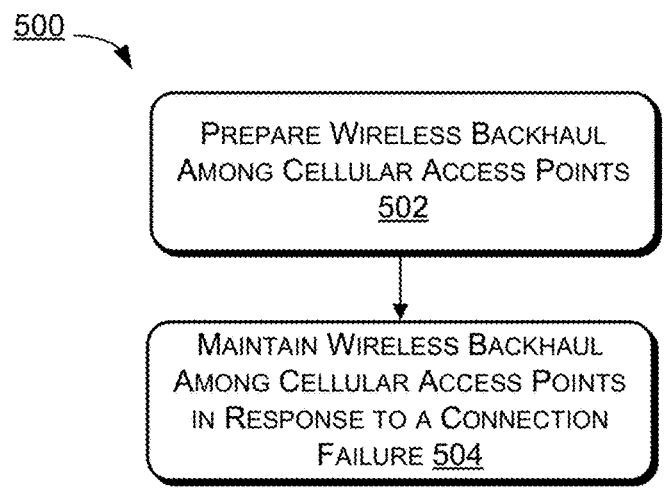
FIG. 5 illustrates an example process for preparing a wireless backhaul among the cellular access points and maintaining the wireless backhaul in response to a connection failure.

FIG. 5 illustrates an example process 500 for preparing a wireless backhaul among the cellular access points and maintaining the wireless backhaul in response to a connection failure. The example process 500 includes, at 502, preparing, by a cellular access point, a wireless backhaul among a plurality of cellular access points. The plurality of cellular access points may include a macrocell system and one or more small cell systems.

At 504, the cellular access point may maintain the wireless backhaul among the cellular access points in response to a connection failure.

Figure 6:
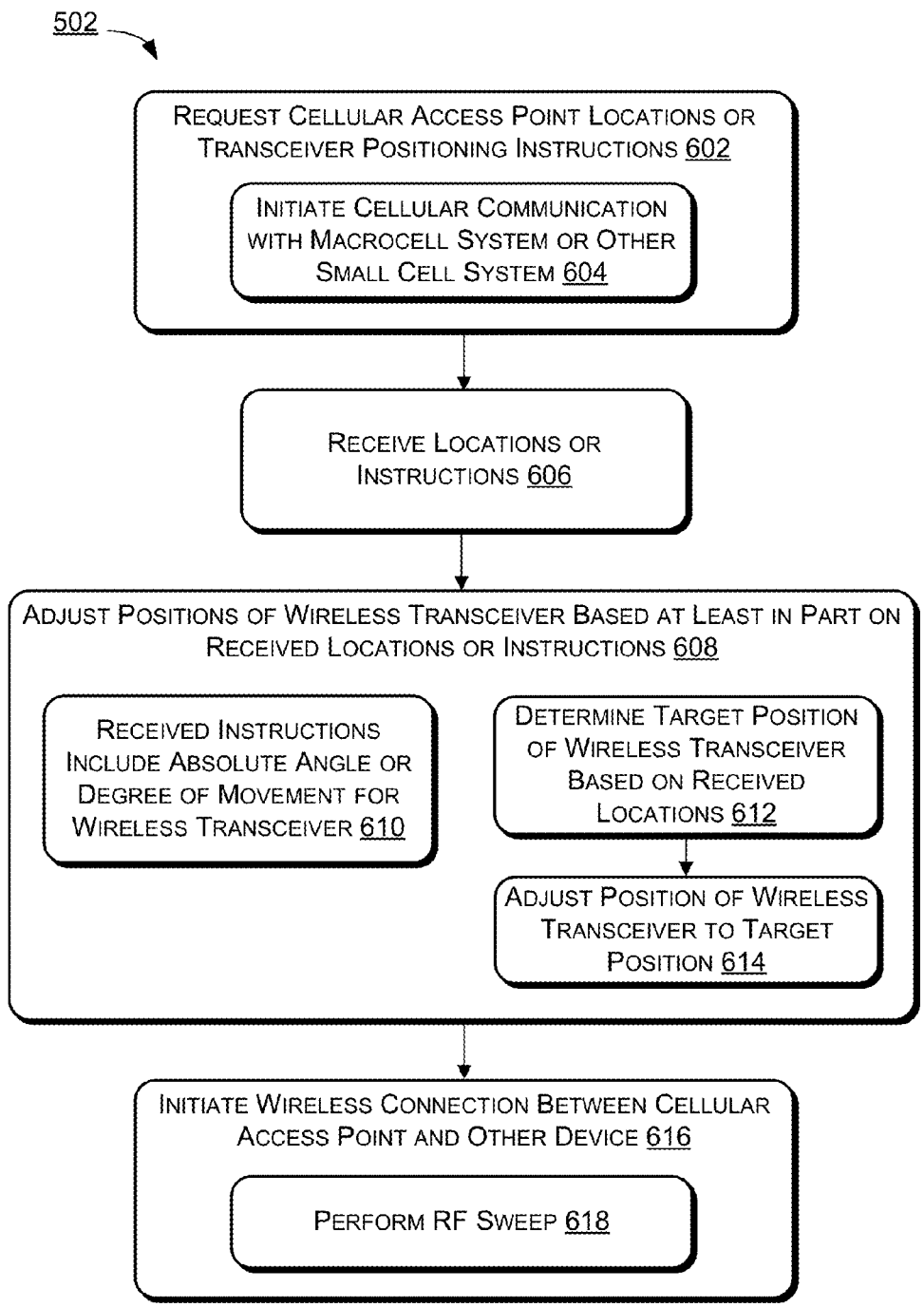
FIG. 6 illustrates an example process for preparing a wireless backhaul among the cellular access points, including a cellular access point receiving locations or instructions, adjusting a position of a wireless transceiver, and initiating wireless communication via the wireless transceiver.

FIG. 6 illustrates an example process 502 for preparing a wireless backhaul among the cellular access points, including a cellular access point receiving locations or instructions, adjusting a position of a wireless transceiver, and initiating wireless communication via the wireless transceiver. The example process 502 illustrates the preparing at block 502 of FIG. 5 in greater detail.

The example process 502 includes, at 602, requesting, by a cellular access point, locations or transceiver positioning instructions. The cellular access point may be a macrocell system or a small cell system, such as a picocell system, a femtocell system, a microcell system, or a radio remote unit. At 604, when the cellular access point is a small cell system, the cellular access point may initiate cellular communication with a macrocell system (or a small cell with a wireline interface) over a portion of licensed spectrum and request the locations or instructions via the cellular communication. The macrocell or small cell system in turn provides the request to a server of the telecommunication network that includes the cellular access points.

At 606, in response to the request, the cellular access point receives either (i) locations of the cellular access point and the at least one other device or (ii) instructions for adjusting a position of at least one wireless transceiver of the cellular access point. The at least one other device may also be a cellular access point. For instance, when the cellular access point is a macrocell system, the at least one other device may be a small cell system. When the cellular access point is a small cell system, the at least one other device may be a macrocell system or another small cell system. Further, the at least one wireless transceiver of the cellular access point may be one of a plurality of separately adjustable wireless transceivers for a corresponding plurality of wireless connections to other devices, including the at least one other device.

At 608, the cellular access point adjusts the position of the at least one wireless transceiver based at least in part on (i) the locations of the cellular access point and the at least one other device or (ii) the instructions. The instructions may include an absolute angle or a degree of movement relative to a current position of the at least one wireless transceiver and, at 610, the adjusting based at least in part on instructions may include adjusting based on an absolute angle or degree of movement.

In response to receiving the locations of the cellular access point and the at least one other device, the adjusting the position includes, at 612, determining a target position enabling the initiating of the wireless communication, the determining being based at least in part on the locations of the cellular access point and the at least one other device. At 614, the adjusting further includes adjusting a current position of the at least one wireless transceiver to the target position.

At 616, the cellular access point may then initiate wireless communication with the at least one other device via the at least one wireless transceiver. The wireless communication may utilize a microwave connection, a WiFi connection, or a WiMax connection. The wireless communication could also utilize some other sort of wireless connection or a cellular connection that does not involve licensed spectrum utilized by the macrocell system/other small cell system for cellular communication. At 618, the initiating may include performing a radio frequency (RF) sweep with the at least one wireless transceiver to detect the at least one device.

Figure 7:
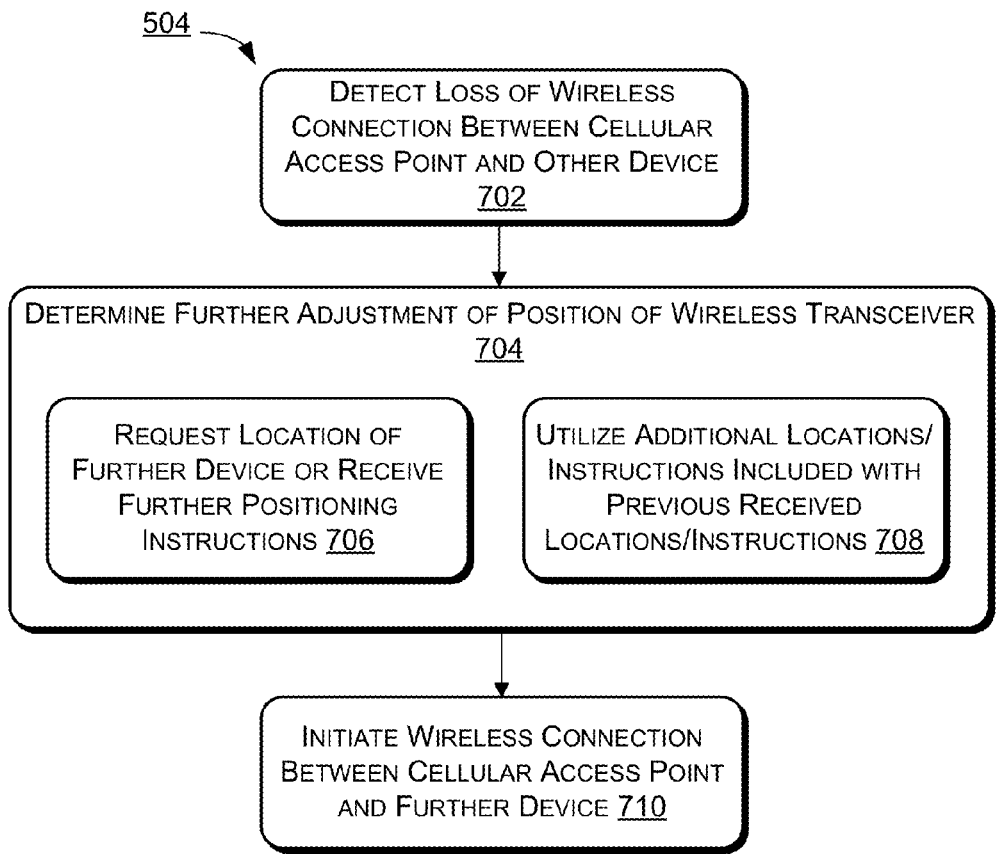
FIG. 7 illustrates an example process for maintaining a wireless backhaul, including a cellular access point detecting loss of a connection, determining a further adjustment of a position of a wireless transceiver, and initiating wireless communication via the wireless transceiver.

FIG. 7 illustrates an example process 504 for maintaining a wireless backhaul, including a cellular access point detecting loss of a connection, determining a further adjustment of a position of a wireless transceiver, and initiating wireless communication via the wireless transceiver. The example process 504 illustrates the maintaining at block 504 of FIG. 5 in greater detail.

The example process includes, at 702, detecting, by the cellular access point, loss of a network connection, such as the wireless connection to the other device.

At 704, the cellular access point determines a further adjustment to the position of the at least one wireless transceiver to enable wireless connection to a further device, At 706, the determining includes requesting a location of the further device or instructions for positioning the at least one wireless transceiver. At 708, the determining includes utilizing additional locations or additional instructions that were received with the locations or instructions at block 606.

At 710, the cellular access point then adjusts the position of the at least one wireless transceiver based on the further adjustment and initiates a wireless connection with the further device via the at least one wireless transceiver.

Figure 8:
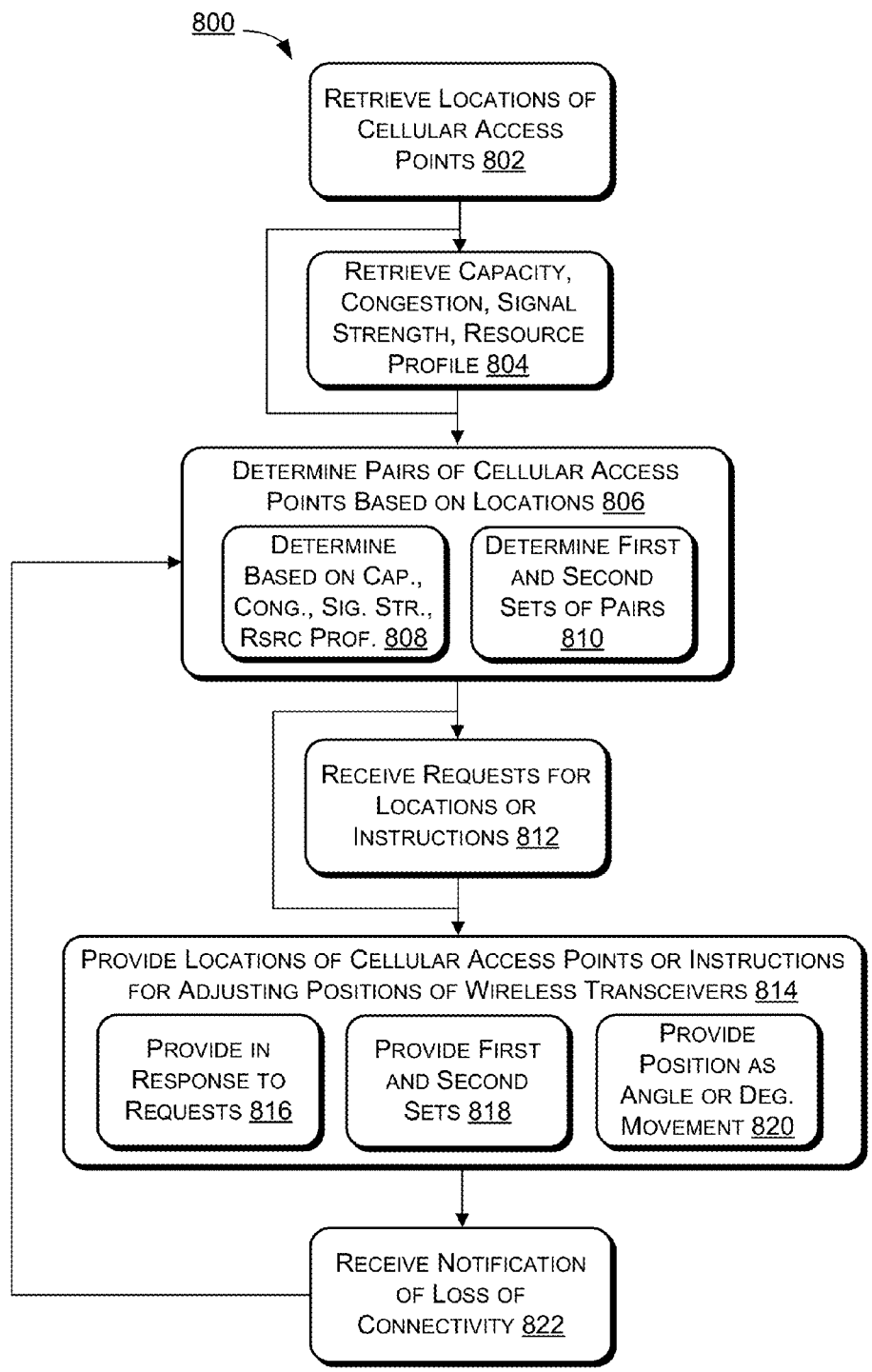
FIG. 8 illustrates an example process for retrieving locations of cellular access points, determining pairs of the cellular access points, and providing locations or instructions to cause each cellular access point of a pair to adjust a position of its wireless transceiver and to enable that pair to initiate a wireless connection via their wireless transceivers.

FIG. 8 illustrates an example process 800 for retrieving locations of cellular access points, determining pairs of the cellular access points, and providing locations or instructions to cause each cellular access point of a pair to adjust a position of its wireless transceiver and to enable that pair to initiate a wireless connection via their wireless transceivers. The example process 800 includes, at 802, retrieving, by a server of a telecommunication network, locations of a plurality of cellular access points. The server may be associated with one or more SON tools or a SON engine for remotely, automatically managing access network settings. The server may retrieve the locations from a repository associated with the server.

At 804, the server may also retrieve one or more of capacity, congestion information, signal strength information, or resource profiles for the cellular access points.

At 806, based at least in part on the retrieved locations, the server determines pairs of ones of the cellular access points. At 808, the determining of the pairs may further be based on the one or more of capacity, congestion information, signal strength information, or resource profiles for the cellular access points. At 810, the determining may further include determining a first set of pairs of ones of the cellular access points and a second set of pairs of ones of the cellular access points.

At 812, the server may receive requests for the locations or instructions from the cellular access points.

At 814, the server provides to each cellular access point (i) locations of that cellular access point and at least one other cellular access point determined to be paired with that cellular access point, or (ii) instructions for adjusting a position of at least one wireless transceiver of that cellular access point to enable communication with the at least one other cellular access point determined to be paired with that cellular access point. At 816, the server may provide the locations or instructions response to the requests received at block 812. At 818, the providing may include providing first and second sets of locations or instructions corresponding to the first and second sets of pairs determined at block 810. At 820, providing the instructions may include providing instructions for adjusting based on an absolute angle or degree of movement.

At 822, the server may receive notification that wireless connectivity between two cellular access points has been lost. In response, the server may repeat the determining at block 806 and the providing at block 814.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A small cell system comprising:
a processor;
a cellular transceiver configured to communicate with a macrocell or other small cell system via a portion of licensed spectrum;
one or more wireless transceivers configured to wirelessly communicate with corresponding one or more devices utilizing a different spectrum than the portion of licensed spectrum; and
a transceiver configuration module configured to be operated by the processor to prepare a wireless backhaul between the small cell system and the one or more devices, the preparing including:
receiving via the cellular transceiver and over the portion of the licensed spectrum either (i) locations of the small cell system and at least one of the one or more devices or (ii) instructions for adjusting a position of at least one of the one or more wireless transceivers,
adjusting the position of the at least one of the one or more wireless transceivers based at least in part on (i) the locations of the small cell system and the at least one of the one or more devices or (ii) the instructions, and
initiating wireless communication with the at least one of the one or more devices via the at least one of the one or more wireless transceivers,
wherein the one or more devices include the macrocell system or the other small cell system.

2. The small cell system of claim 1, wherein the different spectrum is one of a microwave spectrum, a WiFi spectrum, a WiMax spectrum, other unlicensed spectrum, or licensed spectrum which is not utilized by the macrocell system for cellular communication.

3. The small cell system of claim 1, wherein the small cell system is one of a picocell system, a femtocell system, a microcell system, or a radio remote unit.

4. The small cell system of claim 1, wherein the small cell system receives cellular communication from a user device and provides the cellular communication to the macrocell system or the other small cell system over the wireless backhaul.

5. The small cell system of claim 1, wherein the one or more wireless transceivers are configured to be positioned independently of one another.

6. One or more non-transitory computer-readable media comprising a plurality of executable instructions stored on the non-transitory computer-readable media and configured to program a cellular access point to prepare a wireless backhaul between the cellular access point and at least one other device, the preparing including:
receiving either (i) locations of the cellular access point and the at least one other device or (ii) instructions for adjusting a position of at least one wireless transceiver of the cellular access point,
adjusting the position of the at least one wireless transceiver based at least in part on (i) the locations of the cellular access point and the at least one other device or (ii) the instructions, and
initiating wireless communication with the at least one other device via the at least one wireless transceiver,
wherein the executable instructions are further configured to program the cellular access point to maintain the wireless backhaul, the maintaining including:
detecting a loss of the wireless connection with the at least one device; and
in response to detecting the loss of the wireless connection, determining a further adjustment to the position of the at least one wireless transceiver to enable wireless connection to a further device, and initiating a wireless connection to the further device.

7. The one or more non-transitory computer-readable media of claim 6,
wherein the cellular access point is one of a macrocell system, a picocell system, a femtocell system, a microcell system, or a radio remote unit and the at least one other device includes one or more of a picocell system, a femtocell system, a microcell system, or a radio remote unit; or
wherein the cellular access point is one of a picocell system, a femtocell system, a microcell system, or a radio remote unit and the at least one other device includes one or more of a macrocell system, a picocell system, a femtocell system, a microcell system, or a radio remote unit.

8. The one or more non-transitory computer-readable media of claim 6, wherein the at least one wireless transceiver is one of a plurality of separately adjustable wireless transceivers of the cellular access point for a corresponding plurality of wireless connections to other devices, including the at least one other device.

9. The one or more non-transitory computer-readable media of claim 6, wherein the wireless communication utilizes a microwave connection, a WiFi connection, or a WiMax connection.

10. The one or more non-transitory computer-readable media of claim 6, wherein the preparing further includes requesting the locations or instructions from a server of a telecommunication network,
wherein, when the cellular access point is a small cell system, the requesting includes initiating a cellular connection between the cellular access point and either a macrocell system or another small cell system and requesting the locations or instructions via the cellular connection.

11. The one or more non-transitory computer-readable media of claim 6, wherein the adjusting the position includes:
in response to receiving the locations of the cellular access point and the at least one other device, determining a target position enabling the initiating of the wireless communication, the determining being based at least in part on the locations of the cellular access point and the at least one other device, and
adjusting a current position of the at least one wireless transceiver to the target position.

12. The one or more non-transitory computer-readable media of claim 6, wherein the instructions for adjusting the position of the at least one wireless transceiver include an absolute angle or a degree of movement relative to a current position of the at least one wireless transceiver.

13. The one or more non-transitory computer-readable media of claim 6, wherein the initiating the wireless connection comprises performing a radio frequency sweep with the at least one wireless transceiver to detect the at least one device.

14. The one or more non-transitory computer-readable media of claim 6, wherein the determining the further adjustment to the position includes either:
  requesting a location of the further device or instructions specifying a new position of the wireless transceiver, or
  utilizing additional locations or additional instructions received with the locations or instructions.

15. A method for preparing a wireless backhaul between the cellular access point and at least one other device, the method comprising:
  requesting from a server of a telecommunication network, by the cellular access point, either (i) locations of the cellular access point and the at least one other device or (ii) instructions for adjusting a position of at least one wireless transceiver of the cellular access point;
  receiving, by a cellular access point, the locations or instructions;
  adjusting, by the cellular access point, the position of the at least one wireless transceiver based at least in part on the locations or instructions; and
  initiating, by the cellular access point, wireless communication with the at least one other device via the at least one wireless transceiver,
  wherein, when the cellular access point is a small cell system, the requesting includes initiating a cellular connection between the cellular access point and either a macrocell system or another small cell system and requesting the locations or instructions via the cellular connection.

16. The method of claim 15, wherein the cellular access point is the small cell system, and the small cell system is one of a picocell system, a femtocell system, a microcell system, or a radio remote unit.

17. The method of claim 15, wherein the at least one wireless transceiver is one of a plurality of separately adjustable wireless transceivers of the cellular access point for a corresponding plurality of wireless connections to other devices, including the at least one other device.

18. The method of claim 15, wherein the wireless communication utilizes a microwave connection, a WiFi connection, or a WiMax connection.

19. The method of claim 15, wherein the adjusting the position includes:
  in response to receiving the locations of the cellular access point and the at least one other device, determining a target position enabling the initiating of the wireless communication, the determining being based at least in part on the locations of the cellular access point and the at least one other device, and
  adjusting a current position of the at least one wireless transceiver to the target position.

20. The method of claim 15, wherein the instructions for adjusting the position of the at least one wireless transceiver include an absolute angle or a degree of movement relative to a current position of the at least one wireless transceiver.

21. The method of claim 15, wherein the initiating the wireless connection comprises performing a radio frequency sweep with the at least one wireless transceiver to detect the at least one device.

* * * * *